(12) United States Patent
Chou et al.

(10) Patent No.: US 8,508,154 B2
(45) Date of Patent: Aug. 13, 2013

(54) LIGHTING DEVICES

(75) Inventors: Ching-Ho Chou, Taoyuan Hsien (TW);
Chia-Jung Nian, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 297 days.

(21) Appl. No.: 13/092,665

(22) Filed: Apr. 22, 2011

(65) Prior Publication Data

US 2012/0013268 A1    Jan. 19, 2012

(30) Foreign Application Priority Data

Jul. 16, 2010   (TW) .............................. 99123379 A

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |

(52) U.S. Cl.
USPC ............ 315/299; 315/291; 315/297; 315/301

(58) Field of Classification Search
USPC ......... 315/246–247, 291, 294, 297, 299–302, 315/307–308
See application file for complete search history.

(56) References Cited

U.S. PATENT DOCUMENTS

| | | | |
|---|---|---|---|
| 2010/0308751 A1* | 12/2010 | Nerone .......................... | 315/312 |
| 2011/0080102 A1* | 4/2011 | Ge et al. .................... | 315/200 R |

* cited by examiner

*Primary Examiner* — Anh Tran
(74) *Attorney, Agent, or Firm* — Muncy, Geissler, Olds & Lowe, PLLC

(57) ABSTRACT

A lighting device is provided, having at least one light emitting diode module, a power factor correction circuit, a non-regulated isolation DC to DC converter and at least one regulated non-isolation DC to DC converter. The power factor correction circuit performs a power factor correction on an AC power source and outputs a corrected DC voltage. The non-regulated isolation DC to DC converter generates an output voltage in a predetermined voltage range according to the corrected DC voltage, wherein the non-regulated isolation DC to DC converter is an open-loop controlled buck DC to DC converter. The regulated non-isolation DC to DC converter generates a fixed current or a fixed voltage according to the output voltage output from the non-regulated isolation DC to DC converter, thereby driving the light emitting diode module.

20 Claims, 21 Drawing Sheets

US 8,508,154 B2

LIGHTING DEVICES

CROSS REFERENCE TO RELATED APPLICATIONS

This application claims priority of Taiwan Patent Application No. 099123379, filed on Jul. 16, 2010, the entirety of which is incorporated by reference herein.

BACKGROUND OF THE INVENTION

1. Field of the Invention

The present invention relates to lighting devices, and in particular relates to lighting devices having a plurality of light emitting diode modules.

2. Description of the Related Art

Due to durability, lifespan, a thin profile, light weight, low power consumption and no pernicious substances such as mercury (Hg), lighting technology using light emitting diodes (LEDs) has become a significant trend for the future of the lighting and semiconductor industries. Generally, LEDs are widely employed in white light emitting devices, guiding lights, car strobe lights, car lights, flashlights, back light modules for LCDs, light sources for projectors, outdoor display units and the like.

Current LED light sources cannot work with an alternating current (AC) power source directly, and thus, power supply systems are required to drive the LED light sources according to the AC power source. However, the power supply systems increase the cost, size and weight of lighting devices and consume more power. Thus, there is a need for a new lighting device to overcome the said problems.

BRIEF SUMMARY OF THE INVENTION

In light of the previously described problems, the invention provides an embodiment of a lighting device, comprising at least one light emitting diode module, a power factor correction circuit, a non-regulated isolation DC to DC converter and at least one regulated non-isolation DC to DC converter. The power factor correction circuit performs a power factor correction on an AC power source and outputs a corrected DC voltage. The non-regulated isolation DC to DC converter generates an output voltage in a predetermined voltage range according to the corrected DC voltage, wherein the non-regulated isolation DC to DC converter is an open-loop controlled buck DC to DC converter. The regulated non-isolation DC to DC converter generates a fixed current or a fixed voltage according to the output voltage output from the non-regulated isolation DC to DC converter, thereby driving the light emitting diode module.

The invention also provides an embodiment of a lighting device, comprising a non-regulated isolation DC to DC converter, a plurality of light emitting diode modules and a plurality of regulated non-isolation DC to DC converters. The non-regulated isolation DC to DC converter generates an output voltage in a predetermined voltage range according to the corrected DC voltage from a power factor correction circuit, wherein the non-regulated isolation DC to DC converter is an open-loop controlled buck DC to DC converter and comprises a first transformer electrically isolating the corrected DC voltage and the output voltage. The regulated non-isolation DC to DC converters generates a fixed current or a fixed voltage according to the output voltage output from the non-regulated isolation DC to DC converter, thereby driving the light emitting diode module.

The invention provides another embodiment of a lighting device, comprising a light emitting diode module, a power factor correction circuit, a non-regulated isolation DC to DC converter and a regulated non-isolation DC to DC converter. Each of the light emitting diode modules comprises a plurality of light emitting diodes. The power factor correction circuit performs a power factor correction on an AC power source and outputs a corrected DC voltage. The non-regulated isolation DC to DC converter generates an output voltage in a predetermined voltage range according to the corrected DC voltage, wherein the non-regulated isolation DC to DC converter is controlled with an open-loop such that the output voltage is not maintained in a fixed voltage range. The regulated non-isolation DC to DC converter generates a fixed current or a fixed voltage according to the output voltage output from the non-regulated isolation DC to DC converter, thereby driving the light emitting diode module, wherein the non-regulated isolation DC to DC converter comprises a first transformer to electrically isolate the corrected DC voltage and the output voltage, and does not comprises transformer.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
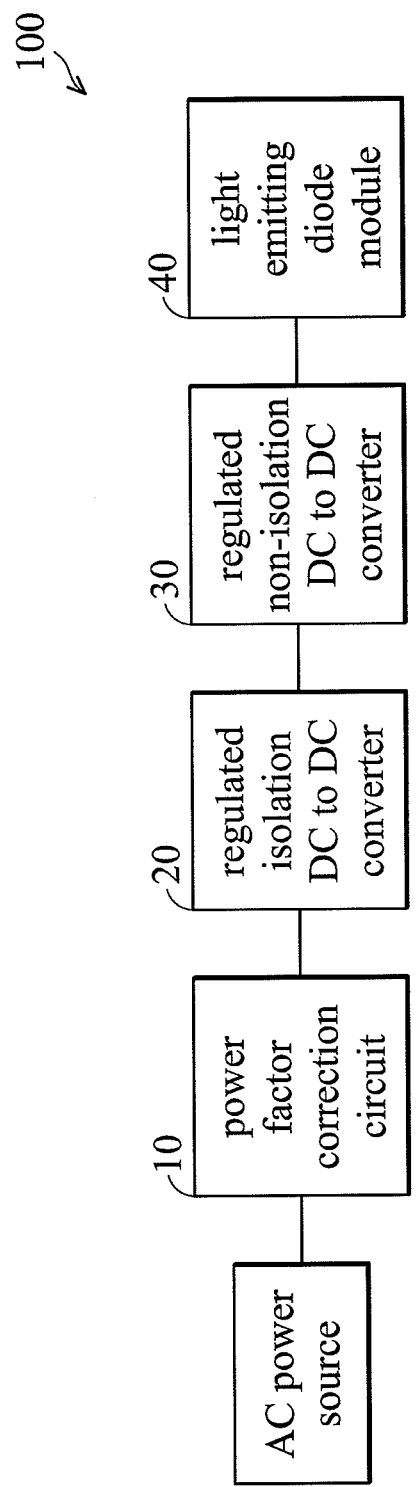
FIG. 1 illustrates an embodiment of a lighting device.

FIG. 1 illustrates an embodiment of a lighting device. As illustrated in FIG. 1, the lighting device 100 comprises a power factor correction circuit 10, a regulated isolation DC to DC converter 20, a regulated non-isolation DC to DC converter 30 and a light emitting diode module 40. In some embodiments, the number of the regulated non-isolation DC to DC converters 30 and the number of the light emitting diode modules 40 both can be more than one. For example, the lighting device 100 can be an outdoor display device, such as a street light, a signboard, an outdoor backlight application etc, but is not limited thereto. The lighting device 100 can also be an indicator light, an automatic signal lamp, an automatic lamp, a flashlight, a back light module of a liquid crystal display, a light source of a projector, etc.

A power supply system of the lighting device 100 is composed of the power factor correction circuit 10, the regulated isolation DC to DC converter 20 and the regulated non-isolation DC to DC converter 30. The power factor correction circuit 10 receives an alternating current (AC) power source and performs a power factor correction on the received AC power source, thereby reaching a requirement for an input current harmonic distortion defined by the IEC6100-3-2 Class C standard, such as that where the total current harmonic distortion is lower than 33% and the power factor is higher than 0.9. For example, the AC power source received by the power factor correction circuit 10 can be 120~277 VAC (U.S. standard), 220~240 VAC (European Union or China standards) or 100 VAC (Japan standard), but is not limited thereto. The power factor correction circuit 10 can be composed of a power factor improved controller and one of a boost converter, a buck converter and bust-boost converter.

The regulated isolation DC to DC converter 20 receives a corrected direct current (DC) voltage from the power factor correction circuit 10 for generating an isolated stable DC output voltage to the regulated non-isolation DC to DC converter 30. For example, the regulated isolation DC to DC converter 20 generates a 12V or 24V fixed DC voltage. In other words, the regulated isolation DC to DC converter 20 is a buck DC to DC converter. The regulated isolation DC to DC converter 20 can be composed of a pulse width modulation (PWM) controller and one of a flyback isolated converter and forward isolated converter, thereby reaching a requirement for stable output voltage. Note that the said "isolation" DC to DC converter is a DC to DC converter having at least one transformer to separate the input voltage from the output voltage.

The regulated non-isolation DC to DC converter 30 serves as a light emitting diode driver by, receiving the DC voltage output from the regulated isolation DC to DC converter 20 to generate a fixed current or a fixed voltage into a light emitting diode module 40 thereby lighting the light emitting diode module 40. For example, the regulated non-isolation DC to DC converter 30 generates 350 mA or 700 mA constant current (i.e., DC current). The regulated non-isolation DC to DC converter 30 is composed of a PWM controller and one of a boost converter, a buck converter and bust-boost converter, thereby reaching a requirement for stable output current.

Each of the light emitting diode modules 40 is an array composed of light emitting diodes connected in serial or parallel to reach a requirement for luminance. The light emitting diode module 40 is operated at a constant current and a voltage higher or lower than the input voltage. FIG. 1 only illustrates one of the light emitting diode modules 40, but in some embodiments (e.g., outdoor signboard or outdoor back light illuminator), the lighting device 100 also comprises a plurality of the regulated non-isolation DC to DC converters 30 (light emitting diode drivers) and a plurality of the light emitting diode modules 40. Each of the light emitting diode modules 40 is operated independently and is not affected by the other light emitting diode modules 40. In some embodiments, the light emitting diode modules 40 are composed of light emitting diodes connected in serial or parallel, but are not limited thereto.

Figure 2:
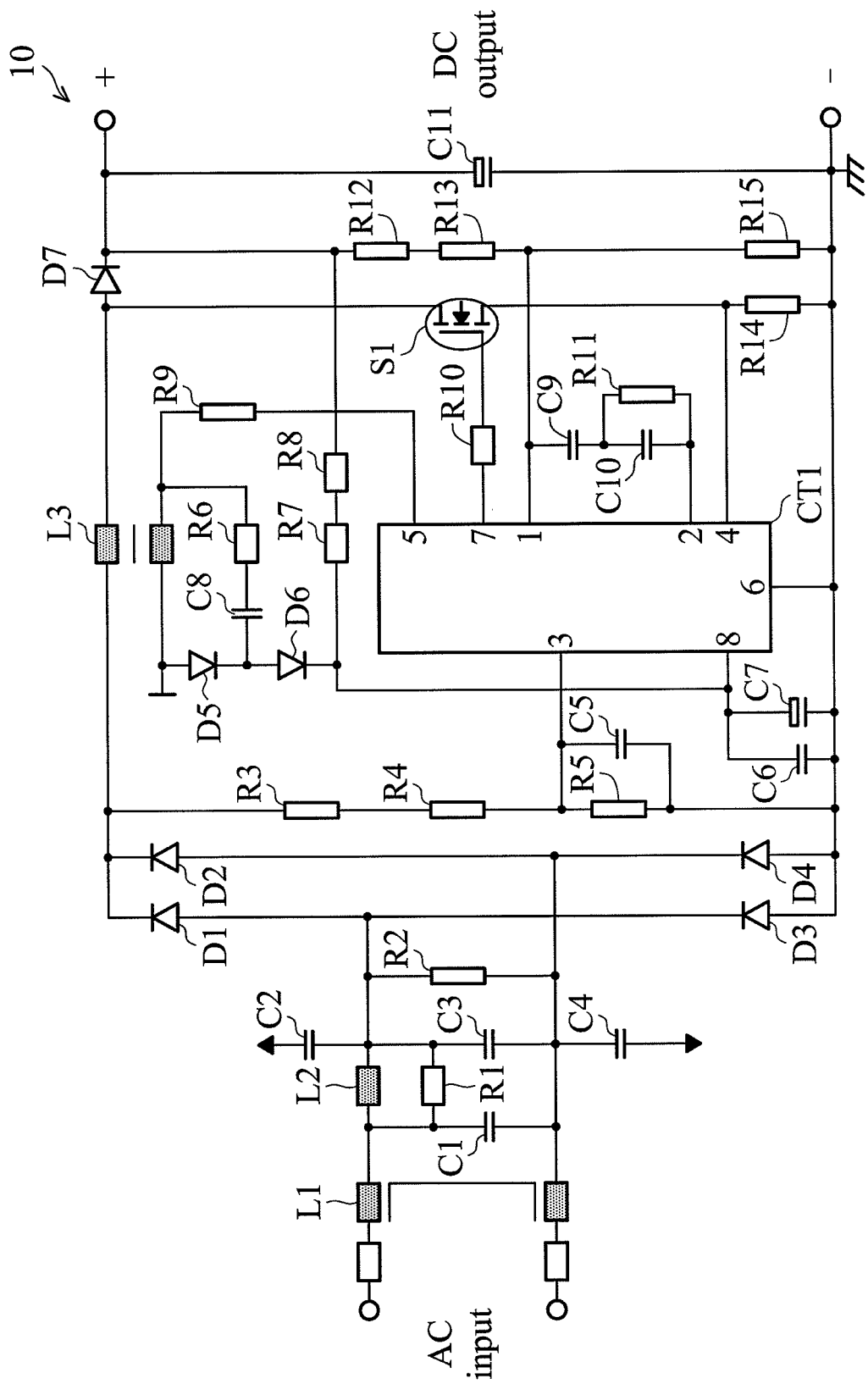
FIG. 2 illustrates an embodiment of a power factor correction circuit.
Figure 3:
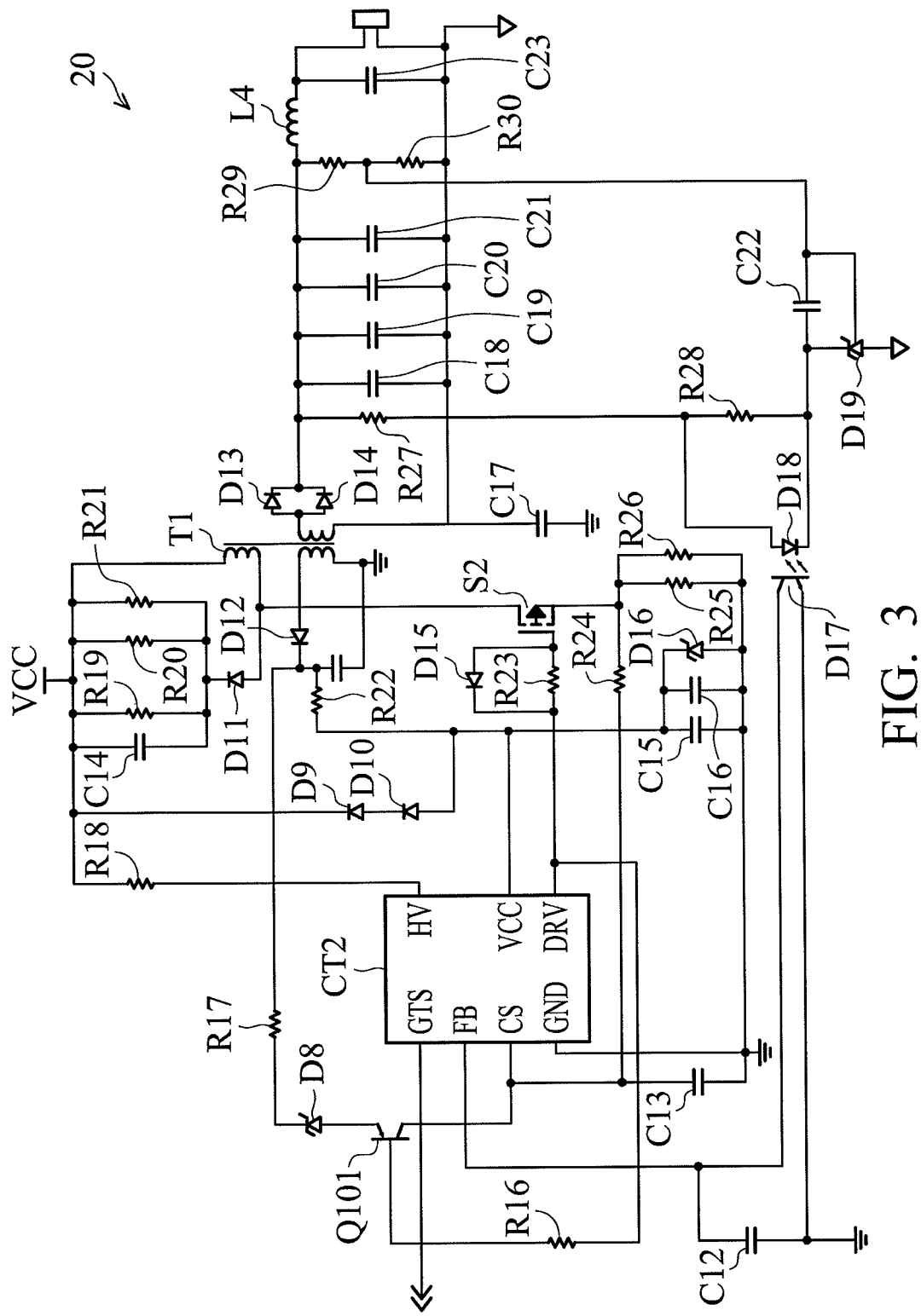
FIG. 3 illustrates an embodiment of a regulated isolation DC to DC converter.
Figure 4:
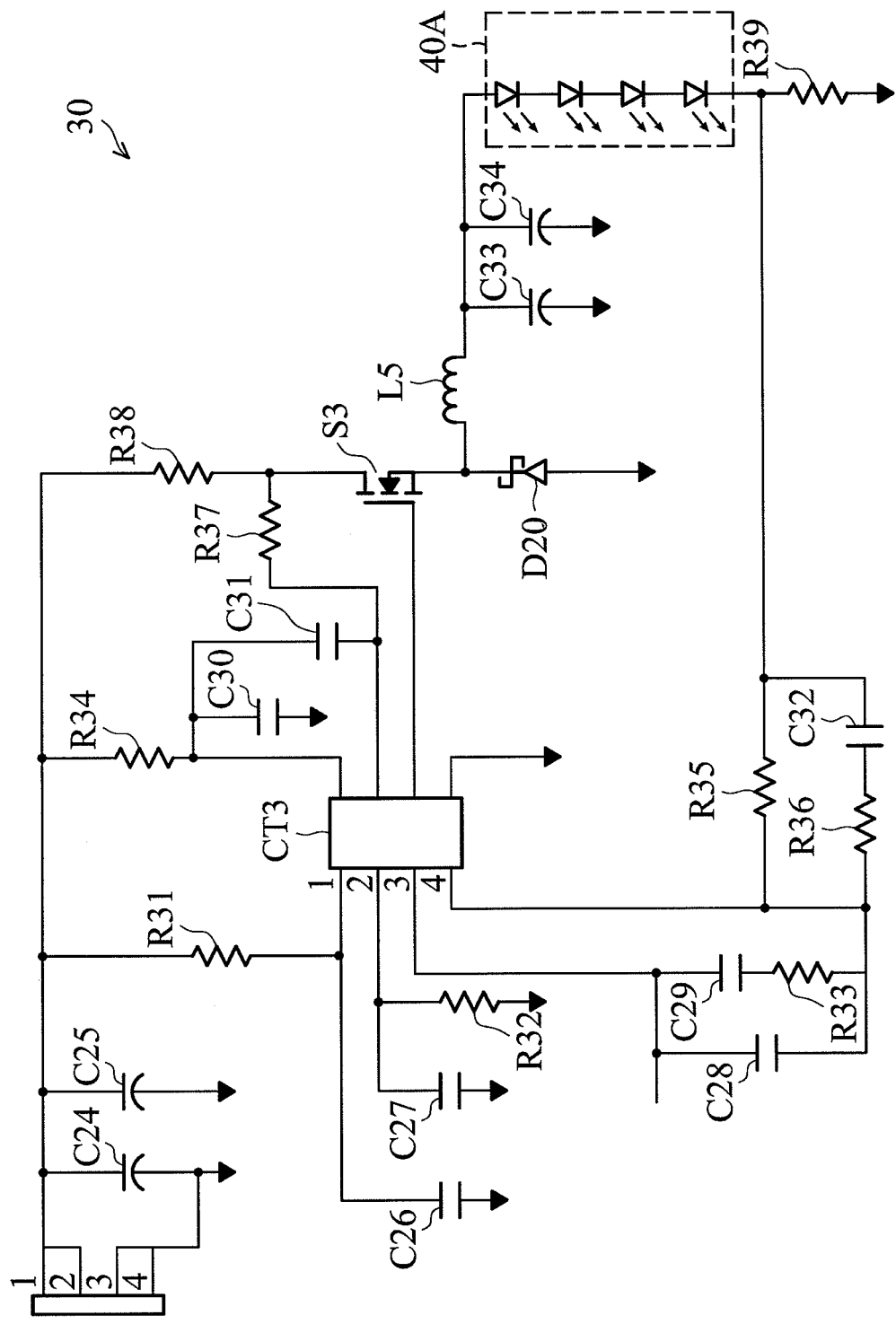
FIG. 4 illustrates an embodiment of a regulated non-isolation DC to DC converter.

FIG. 2 illustrates an embodiment of a power factor correction circuit. As illustrated in FIG. 2, the power factor correction circuit 10 is composed of resistors R1~R15, capacitors C1~C11, inductors L1~L3, diodes D1~D7, a switching device S1 and a controller CT1. FIG. 3 illustrates an embodiment of a regulated isolation DC to DC converter. The regulated isolation DC to DC converter is composed of a transistor Q101, resistors R16~R30, capacitors C12~C23, an inductor L4, a transformer T1, diodes D8~D16 and D19, photo couplers D17 and D18, a switching device S2 and a controller CT2. FIG. 4 illustrates an embodiment of a regulated non-isolation DC to DC converter. The regulated non-isolation DC to DC converter 30 serves as a light emitting diode driver and is composed of resistors R31~R39, capacitors C24~C34, an inductor L5, a diode D20, a switching device S3 and a controller CT3 to drive a light emitting diode module 40A.

Figure 5:
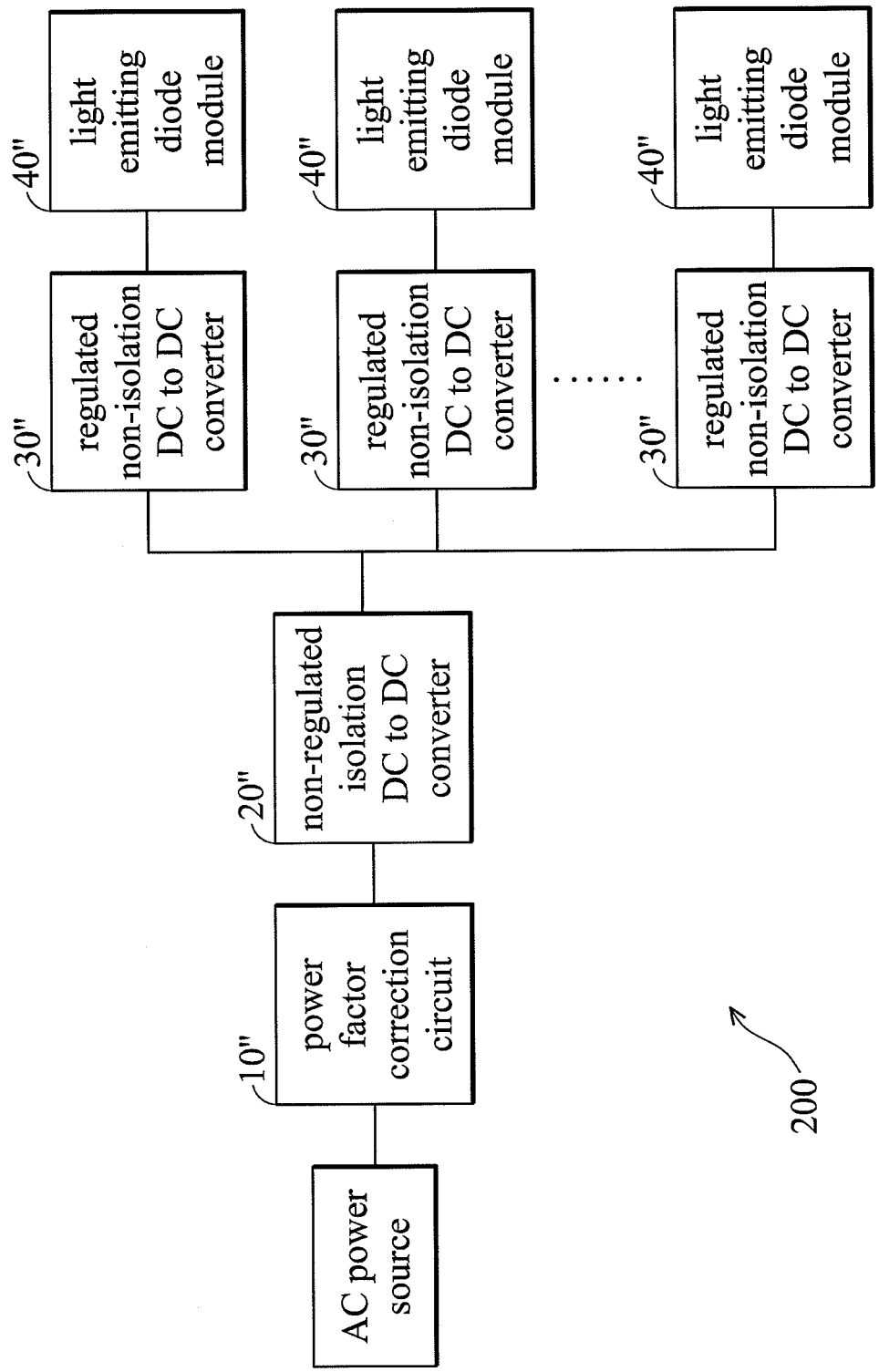
FIG. 5 illustrates another embodiment of a lighting device of the invention.

In order to improve the efficiency of the power factor correction circuit 10 and the regulated isolation DC to DC converter 20, FIG. 5 provides another embodiment of a lighting device of the invention. As show in FIG. 5, a lighting device 200 comprises a power factor correction circuit 10", a non-regulated isolation DC to DC converter 20", a regulated non-isolation DC to DC converter 30" and a light emitting diode module 40", wherein operations of the power factor correction circuit 10" and the light emitting diode module 40" are similar to that of the power factor correction circuit 10 and the light emitting diode module 40 illustrated in FIG. 1, and thus, detailed descriptions are omitted for brevity. In some embodiments, the number of the regulated non-isolation DC to DC converters 30" and the number of the light emitting diode modules 40" can be 1, respectively.

Note that the difference between the regulated isolation DC to DC converter 20 and the non-regulated isolation DC to DC converter 20", is that the later generates a non-fixed (floating) output voltage in a predetermined voltage range to the regulated non-isolation DC to DC converter 30". In some embodiments, the predetermined voltage range is defined by an upper threshold and a lower threshold. The upper threshold and the lower threshold are rated voltages of the non-regulated isolation DC to DC converter 20" operating at a full load state and a no-load state, respectively. The difference between the upper threshold and the lower threshold is lower than 100V. For example, the predetermined voltage range can be 0~100V, but is not limited thereto. In other words, the output voltage generated by the non-regulated isolation DC to DC converter 20" can be 5V, 10V, 50V or one voltage value of the voltage range 0V~100V. Therefore, the output voltage output from the non-regulated isolation DC to DC converter 20" is not fixed and different from the output voltage (fixed in 12V or 24V) output from the regulated isolation DC to DC converter 20. The regulated non-isolation DC to DC converter 30" serves as a light emitting diode driver by, receiving the non-fixed DC voltage output from the non-regulated isolation DC to DC converter 20" to generate a fixed current or a fixed voltage corresponding to the light emitting diode module 40".

In this embodiment, the non-regulated isolation DC to DC converter 20" can be a buck converter with a symmetrical duty cycle. Thus, the duty cycle in a secondary winding is the same as that in a primary winding. For example, the non-regulated isolation DC to DC converter 20" can be a half-bridge isolated converter or a full-bridge isolated converter controlled by an open loop and/or a self-excited design. In other words, in the this embodiment, there is no need for performing loop control on the switching device by a pulse width modulation (PWM) according to the output voltage to maintain the output voltage at a constant voltage. In an application using 180 W, compared with a close loop flyback isolation converter, the efficiency of the non-regulated isolation DC to DC converter 20" implemented by an open loop control and self-excited control half-bridge isolated converter is improved by more than 5%. In addition, there is no need for the pulse width modulation controller to perform a feedback control such that the circuit design is simpler. The volume of the power system is decreased by 30% and the cost thereof is also decreased.

Figure 6A:
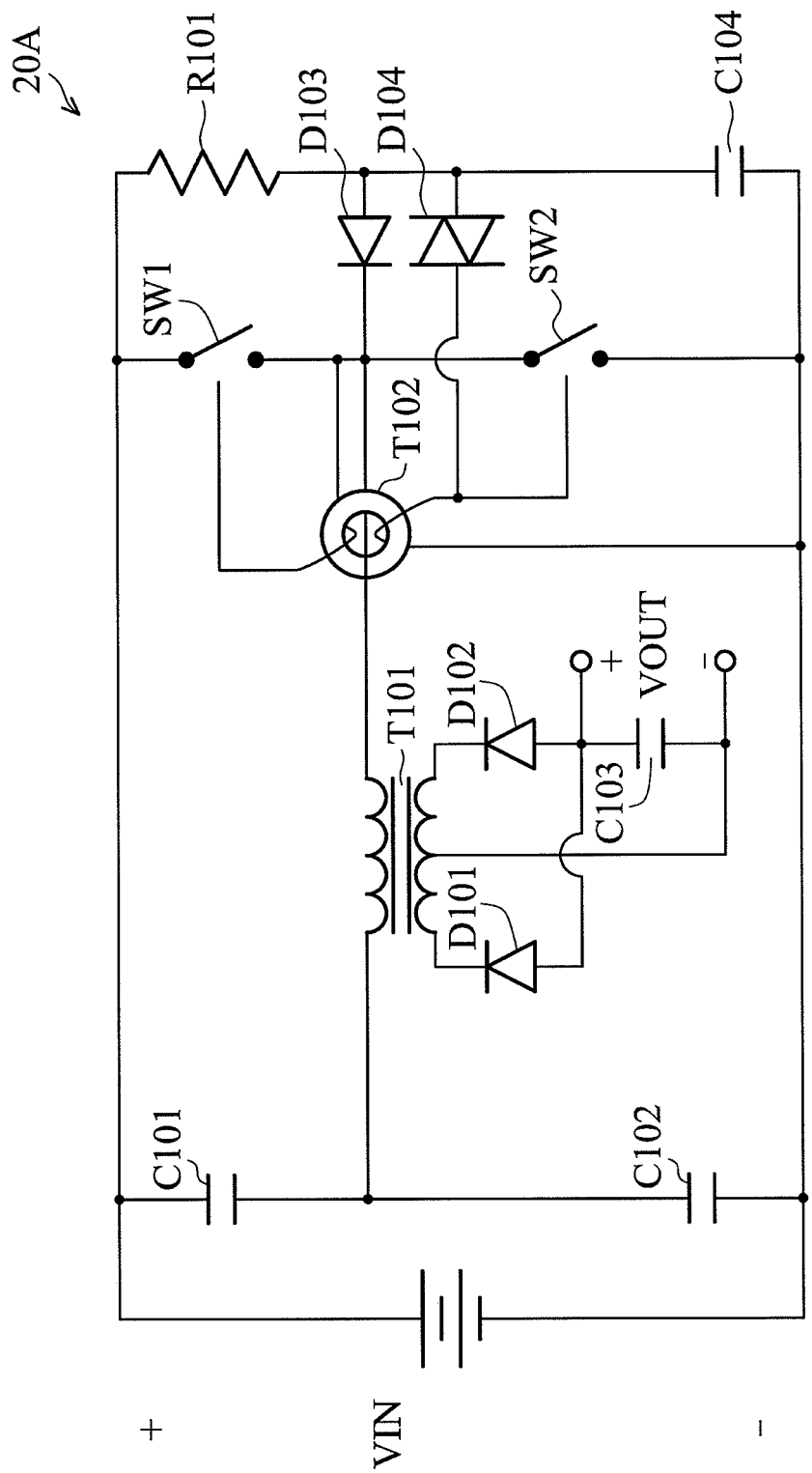
FIG. 6A illustrates an embodiment of a non-regulated isolation DC to DC converter 20" of the invention.

FIG. 6A illustrates an embodiment of a non-regulated isolation DC to DC converter 20" of the invention. As illustrated in FIG. 6A, a non-regulated isolation DC to DC converter 20A is a self-excited and open-loop controlled half-bridge DC to DC converter, and the voltage output from the non-regulated isolation DC to DC converter 20A is not regulated. For example, the non-regulated isolation DC to DC converter 20A receives the voltage output from the power factor correction circuit 10" to generate a non-fixed output voltage VOUT lower than 60V. For example, when the AC power source is 200~240 VAC, the voltage output from the power factor correction circuit 10" is 400V (DC voltage). When the AC power source is 120~277 VAC, the voltage output from the power factor correction circuit 10" is 450V (DC voltage). Furthermore, in the non-regulated isolation DC to DC converter 20A, the duty cycles in the primary winding and the secondary winding are symmetrical. The output voltage VOUT of the non-regulated isolation DC to DC converter 20A is lower than an input voltage VIN and changes in accordance with a load. For example, the output voltage VOUT is lower in a full load state, and the output voltage VOUT is higher in a light load state.

The non-regulated isolation DC to DC converter 20A is composed of capacitors C101~C104, diodes D101~D104, transformers T101 and T102 and switching devices SW1~SW2, wherein a rectifier circuit is composed of the diodes D101 and D102 and the capacitor C103, and a startup circuit is composed of the diodes D103 and D104, the resistor R101 and the capacitor C104. The switching devices SW1 and SW2 can be a bidirectional turn-on circuit (e.g., MOSFET) or a combination of a unidirectional conduction circuit (e.g., IGBT or BJT) and a diode. For example, the diodes D101 and D102 are rectifier diodes and the diode D104 is a diode AC switch (DIAC). The capacitors C1 and C2 are storage capacitors such as electrolytic capacitors or film capacitors, but are not limited thereto. The transformer T102 serves as a driving transformer for the switching devices SW1 and SW2, and the transformer T102 can be a saturated transformer or a non-saturated transformer.

The capacitor C101 has a first terminal coupled to a positive terminal of the input voltage VIN and a second terminal coupled to the capacitor C102. The capacitor C102 has a first terminal coupled to the first terminal of the capacitor C101 and a second terminal connected to a negative terminal (i.e., ground) of the input voltage VIN. The primary winding of the transformer T101 has a first terminal coupled to the second terminal of the capacitor C102 and a second terminal coupled to the transformer T102. The secondary winding of the transformer T101 has a first terminal coupled to a cathode of the diode D101 and a second terminal coupled to a cathode of the diode D102. The capacitor C103 has a first terminal coupled to anodes of the diodes D101 and D102 and a second terminal coupled to a center tap of the secondary winding of the transformer T101. The rectifier circuit, composed of the diodes D101 and D102 and the capacitor C103, rectifies the AC voltage generated by the secondary winding of the transformer T101 to the DC voltage and then stores the DC voltage in the capacitor C103.

The switching device SW1 has a first terminal coupled to the first terminal of the capacitor C101 and a second terminal coupled to the switching device SW2. The switching device SW2 has a first terminal coupled to the second terminal of the switching device SW1 and a second terminal coupled to ground. The transformer T102 is coupled between the transformer T101 and the switching devices SW1 and SW2. The transformer T102 has three coils. The main coil is coupled to the transformer T101. The first and second coils drive the switching devices SW1 and SW2, respectively. For example, two terminals of the first coil are coupled to a control terminal and the second terminal of the switching device SW1, respectively. Two terminals of the second coil are coupled to a control terminal and the second terminal of the switching device SW2, respectively. In this embodiment, the switching devices SW1 and SW2 have the same duty cycle (i.e., symmetrical period). For example, the switching frequencies of the switching devices SW1 and SW2 are in the range of 20 KHz to 33 KHz or over 40 KHz to differ from the frequency of an infrared remote controller, but are not limited thereto. In addition, the switching frequency can be changed in accordance with the loading. For example, the switching frequency is lower in the full load state, but the switching frequency is higher in the light load state.

The resistor R101 has a first terminal coupled to the first terminal of the switching device SW1 and a second terminal coupled to an anode of the diode D103. A cathode of the diode D103 is coupled to the second terminal of the switching device SW1. The diode D104 has a first terminal coupled to the second terminal of the resistor R101 and a second terminal coupled to the control terminal of the switching device SW2. The capacitor C104 has a first terminal coupled to the first terminal of the diode D104 and a second terminal coupled to ground.

The capacitor C104 is charged by the input voltage VIN through the resistor R101. When the voltage stored in the capacitor C104 is higher than a predetermined voltage (e.g., 32V), the diode D104 is broken down such that the capacitor C104 generates a discharge current by the diode D104 to turn on the switching device SW2 for startup. The input voltage VIN can be transformed into a high frequency AC square wave, which is applied to the primary winding of the transformer T101 by turning on the switching devices SW1 and SW2 alternately. After turning on the switching devices SW1 and SW2 alternately, the voltage of the capacitor C104 is discharged by the switching device SW2 such that the non-regulated isolation DC to DC converter 20A is not started up again.

Because the switching devices SW1 and SW2 of the non-regulated isolation DC to DC converter 20A are controlled by the voltage applied to the first coil and the second coil, the non-regulated isolation DC to DC converter 20A is a self-excited and open-loop controlled half-bridge DC to DC converter. As described above, the power supply system of the invention provides power to a plurality of light emitting diode modules without a controller (e.g., pulse width modulations (PWM)) to perform close-loop control for maintaining the output voltage VOUT at a fixed value. Therefore, the circuit design is much simpler and the cost thereof is decreased. The volume of the power supply system is decreased by 30%. Furthermore, compared with a close-loop controlled flyback isolation converter, the non-regulated isolation DC to DC converter 20A improves efficiency of the power supply system by 5%.

Figure 6B:
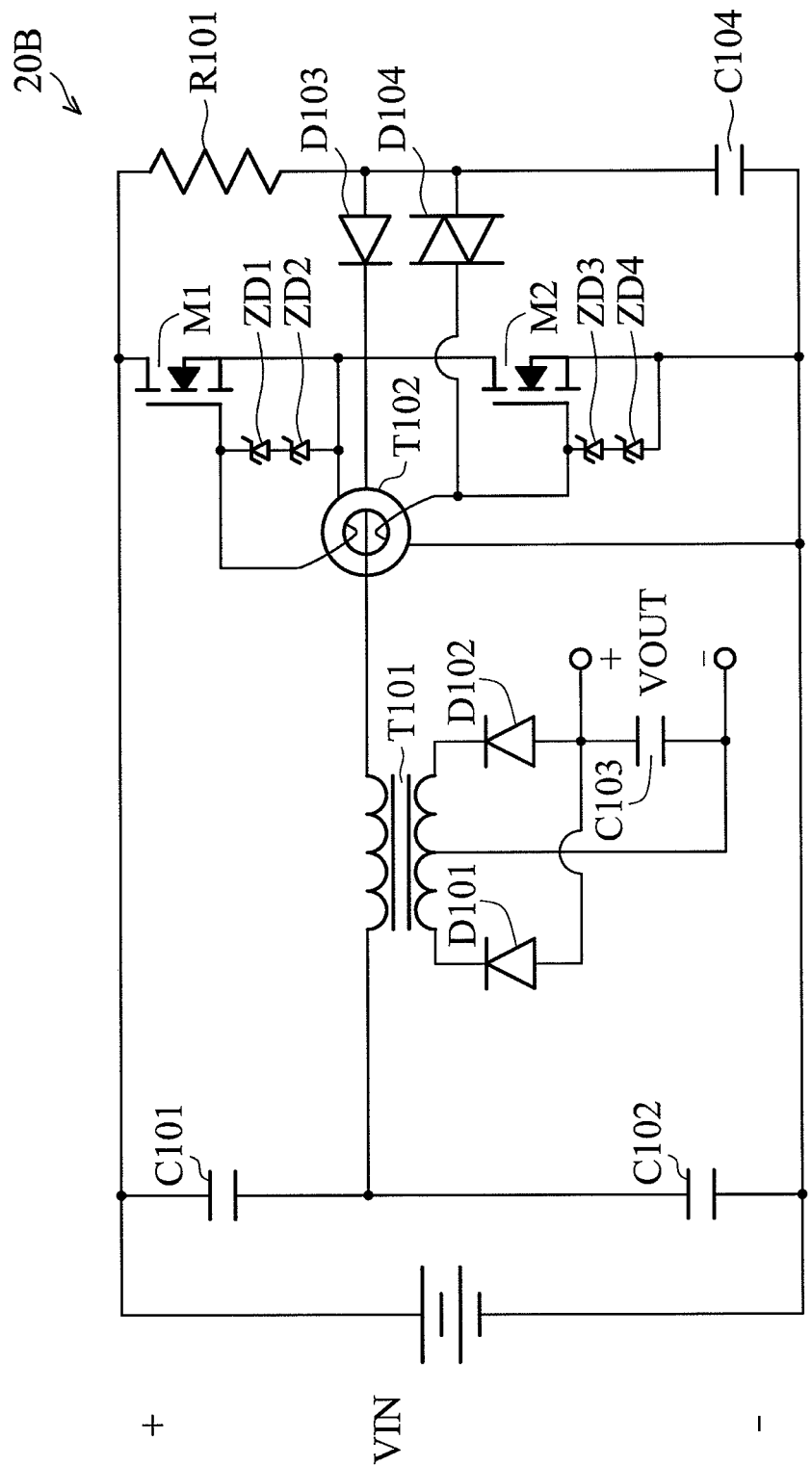
FIG. 6B illustrates an embodiment of a non-regulated isolation DC to DC converter 20" of the invention.

FIG. 6B illustrates another embodiment of a non-regulated isolation DC to DC converter 20" of the invention. As illustrated in FIG. 6B, the non-regulated isolation DC to DC converter 20B is similar to the non-regulated isolation DC to DC converter 20A illustrated in FIG. 6A. The difference is that the switching device SW1 is replaced by a metal oxide semiconductor field effect transistor (MOSFET) M1 and zener diodes ZD1 and ZD2, and the switching device SW2 is replaced by a MOSFET M2 and zener diodes ZD3 and ZD4. The MOSFET M1 is coupled between the positive terminal of the input voltage VIN and a first terminal of the MOSFET M2. The MOSFET M2 is coupled between a second terminal of the MOSFET M1 and the negative terminal of the input voltage VIN. Two terminals of the first coil of the transformer T102 are coupled to a control terminal and the second terminal of the MOSFET M1. Two terminals of the second coil of the transformer T102 are coupled to a control terminal and a second terminal of the MOSFET M2. The zener diodes ZD1 and ZD2 are coupled inversely in serial between the control terminal and the second terminal of the MOSFET M1. The zener diodes ZD3 and ZD4 are coupled inversely in serial between the control terminal and the second terminal of the MOSFET M2. The operation of the non-regulated isolation DC to DC converter 20B is similar to the operation of the non-regulated isolation DC to DC converter 20A illustrated in FIG. 6A, and thus, detailed descriptions are omitted for brevity.

Figure 6C:
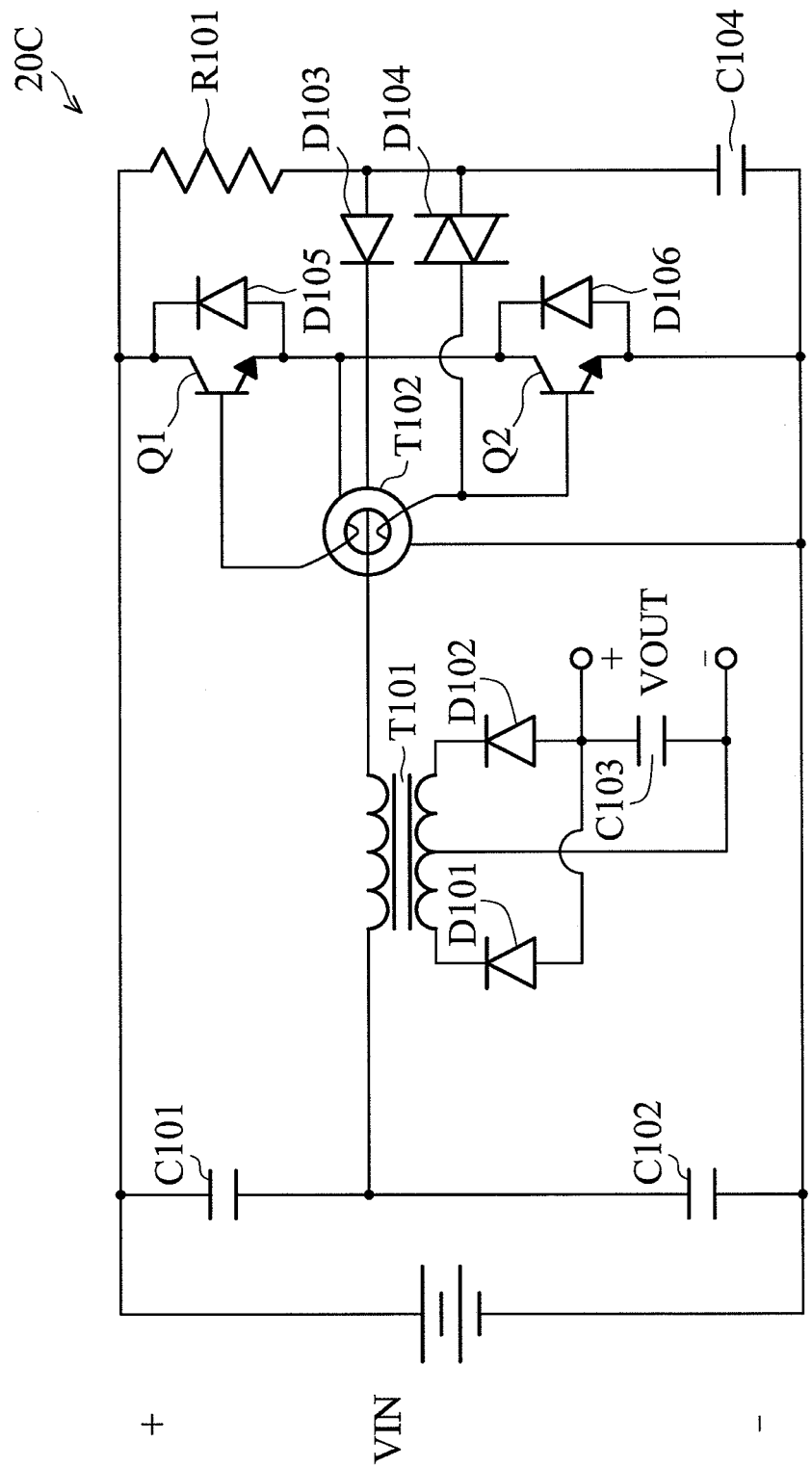
FIG. 6C illustrates an embodiment of a non-regulated isolation DC to DC converter 20" of the invention.

FIG. 6C illustrates another embodiment of a non-regulated isolation DC to DC converter 20" of the invention. As illustrated in FIG. 6C, the non-regulated isolation DC to DC converter 20C is similar to the non-regulated isolation DC to DC converter 20A illustrated in FIG. 6A. The difference is that the switching device SW1 is replaced by a bipolar junction transistor (BJT) Q1 and a diode D105 and the switching device SW2 is replaced by a BJT Q2 and a diode D106. The BJT Q1 is coupled between the positive terminal of the input voltage VIN and a collector of the BJT Q2. The BJT Q2 is coupled between an emitter of the BJT Q1 and the negative terminal of the input voltage VIN. Two terminals of the first coil of the transformer T102 are coupled to a base and the emitter of the BJT Q1, respectively. Two terminals of the second coil of the transformer T102 are coupled to a base and an emitter of the BJT Q2, respectively. A cathode and an anode of the diode D105 are coupled to a collector and the emitter of the BJT Q1, respectively. A cathode and an anode of the diode D106 are coupled to the collector and the emitter of the BJT Q2, respectively. The operation of the non-regulated isolation DC to DC converter 20C is similar to the operation of the non-regulated isolation DC to DC converter 20A illustrated in FIG. 6A, and thus, detailed descriptions are omitted for brevity.

Figure 6D:
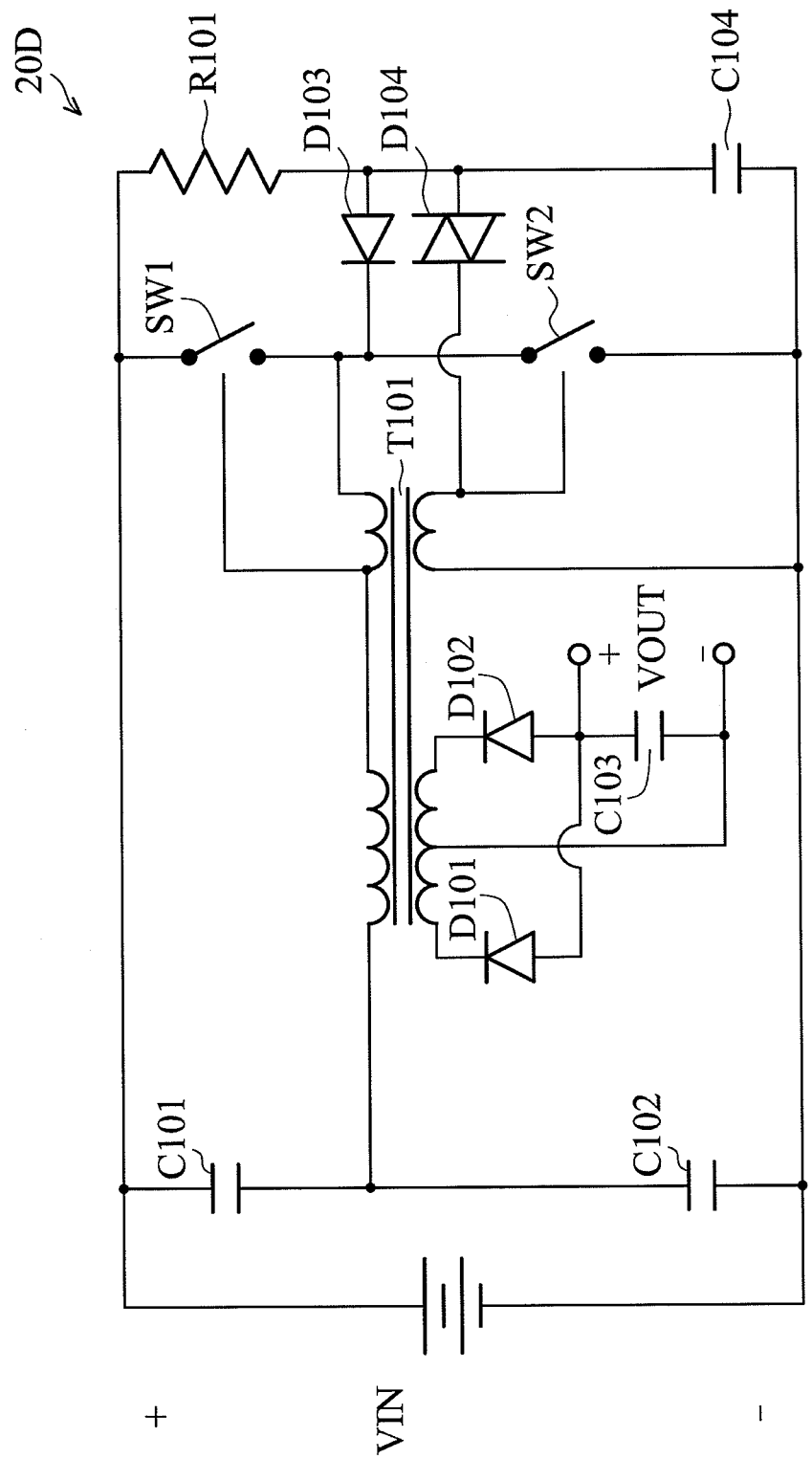
FIG. 6D illustrates an embodiment of a non-regulated isolation DC to DC converter 20" of the invention.

FIG. 6D illustrates another embodiment of a non-regulated isolation DC to DC converter 20" of the invention. As illustrated in FIG. 6D, the non-regulated isolation DC to DC converter 20D is similar to the non-regulated isolation DC to DC converter 20A illustrated in FIG. 6A. The difference is that the switching devices SW1 and SW2 are driven by the voltage generated on the coils of the transformer T101 rather than that of the transformer T102.

Figure 6E:
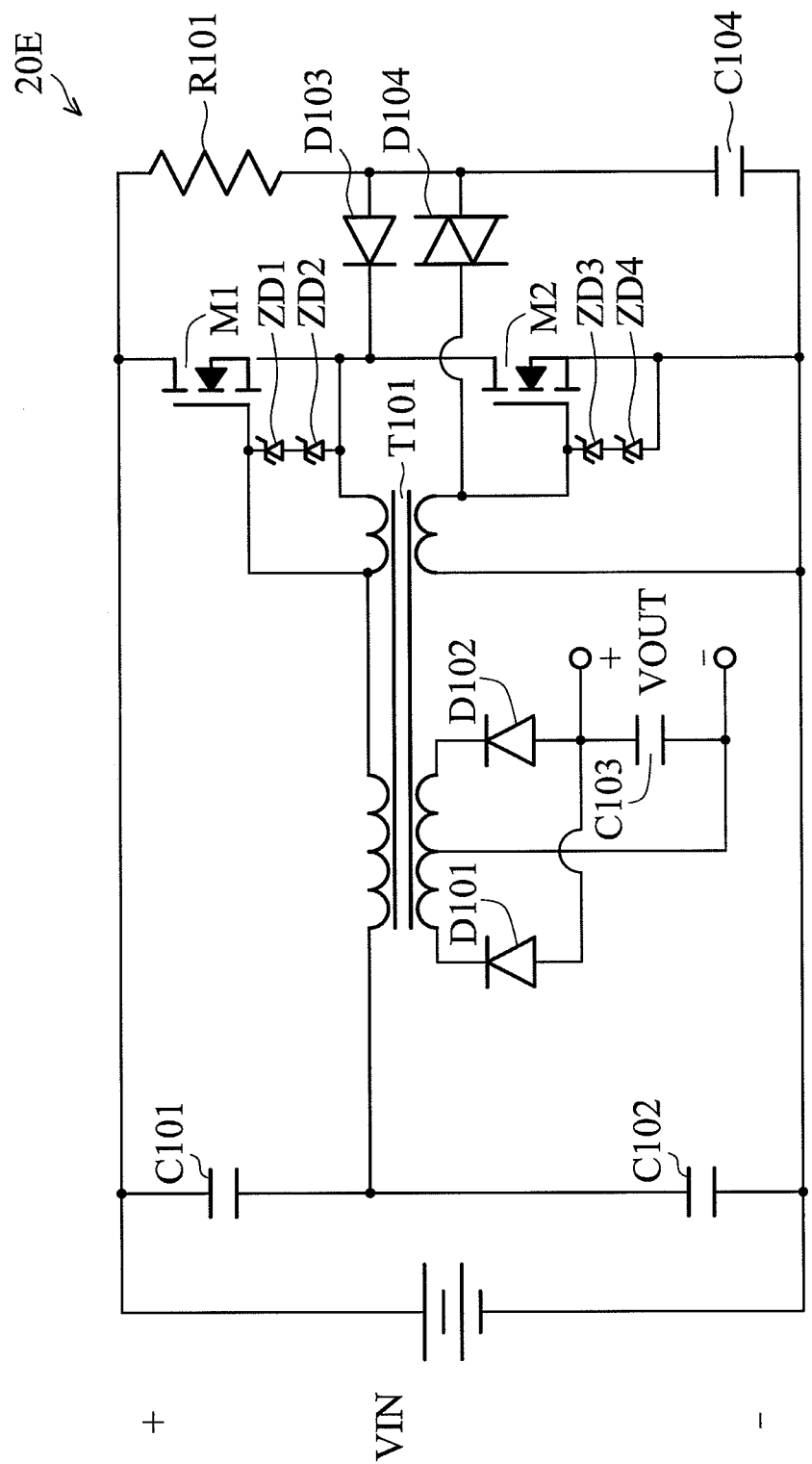
FIG. 6E illustrates an embodiment of a non-regulated isolation DC to DC converter 20" of the invention.

FIG. 6E illustrates another embodiment of a non-regulated isolation DC to DC converter 20" of the invention. As illustrated in FIG. 6E, the non-regulated isolation DC to DC converter 20E is similar to the non-regulated isolation DC to DC converter 20B illustrated in FIG. 6B. The difference is that the MOSFETs M1 and M2 are driven by the voltage generated on the coils of the transformer T101 rather than that of the transformer T102.

Figure 6F:
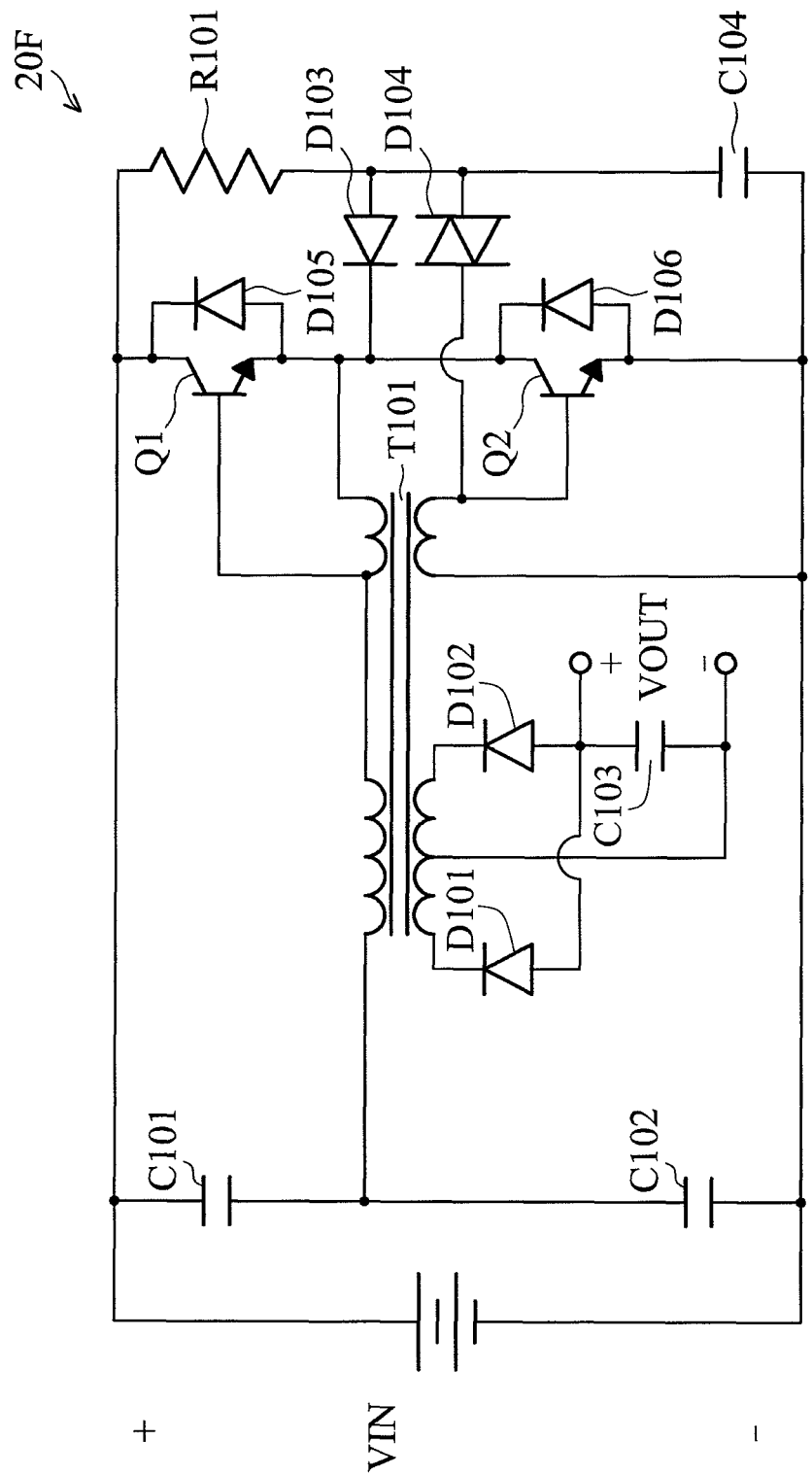
FIG. 6F illustrates an embodiment of a non-regulated isolation DC to DC converter 20" of the invention.

FIG. 6F illustrates another embodiment of a non-regulated isolation DC to DC converter 20" of the invention. As illustrated in FIG. 6F, the non-regulated isolation DC to DC converter 20F is similar to the non-regulated isolation DC to DC converter 20C illustrated in FIG. 6C. The difference is that the BJTs Q1 and Q2 are driven by the voltage generated on the coils of the transformer T101 rather than that of the transformer T102.

Figure 6G:
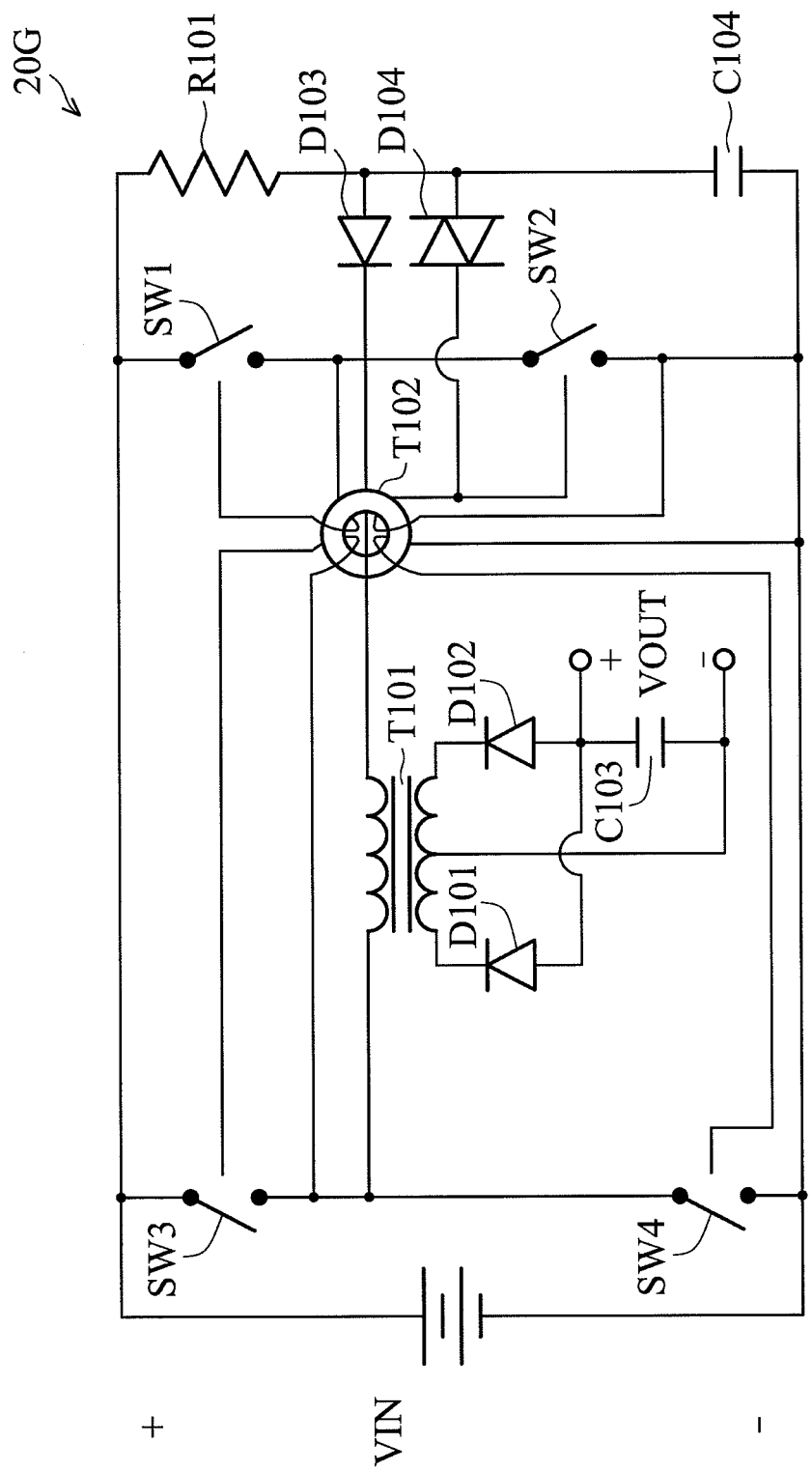
FIG. 6G illustrates an embodiment of a non-regulated isolation DC to DC converter 20" of the invention.

FIG. 6G illustrates another embodiment of a non-regulated isolation DC to DC converter 20" of the invention. As illustrated in FIG. 6G, the non-regulated isolation DC to DC converter 20G is similar to the non-regulated isolation DC to DC converter 20A illustrated in FIG. 6A. The difference is that the capacitors C101 and C102 are replaced by switching devices SW3 and SW4, respectively, such that the non-regulated isolation DC to DC converter 20G is a self-excited and open-loop controlled full-bridge DC to DC converter. The transformer T102 has five coils. The main coil is coupled to the transformer T101 and the first to fourth coils drive the switching devices SW1~SW4, respectively. For example, two terminals of the first coil are coupled to the control terminal and the second terminal of the switching device SW1, respectively. Two terminals of the second coil are coupled to the control terminal and the second terminal of the switching device SW2, respectively. Two terminals of the third coil are coupled to the control terminal and the second terminal of the switching device SW3, respectively. Two terminals of the fourth coil are coupled to the control terminal and the second terminal of the switching device SW4, respectively.

The capacitor C104 is charged by the input voltage VIN through the resistor R101. When the voltage stored in the capacitor C104 is higher than a predetermined voltage (e.g., 32V), the diode D104 is broken down such that the capacitor C104 generates a discharge current by the diode D104 to turn on the switching devices SW2 and SW3 for startup. The input voltage VIN can be transformed into a high frequency AC square wave, which is applied to the primary winding of the transformer T101 by alternately turning on the group of the switching devices SW1 and SW4 and the other group of the switching devices SW2 and SW3. After alternately turning on the group of the switching devices SW1 and SW4 and the other group of the switching devices SW2 and SW3, the voltage of the capacitor C104 is discharged by the switching device SW2 such that the non-regulated isolation DC to DC converter 20G is not turned on again by the diode D104. In this embodiment, the switching devices SW1~SW4 are driven by the voltage of the coils of the transformer T102. Thus, there is no need for a controller (e.g., a PWM controller) to perform close-loop control on the switching devices SW1~SW4 according to the output voltage VOUT.

Figure 6H:
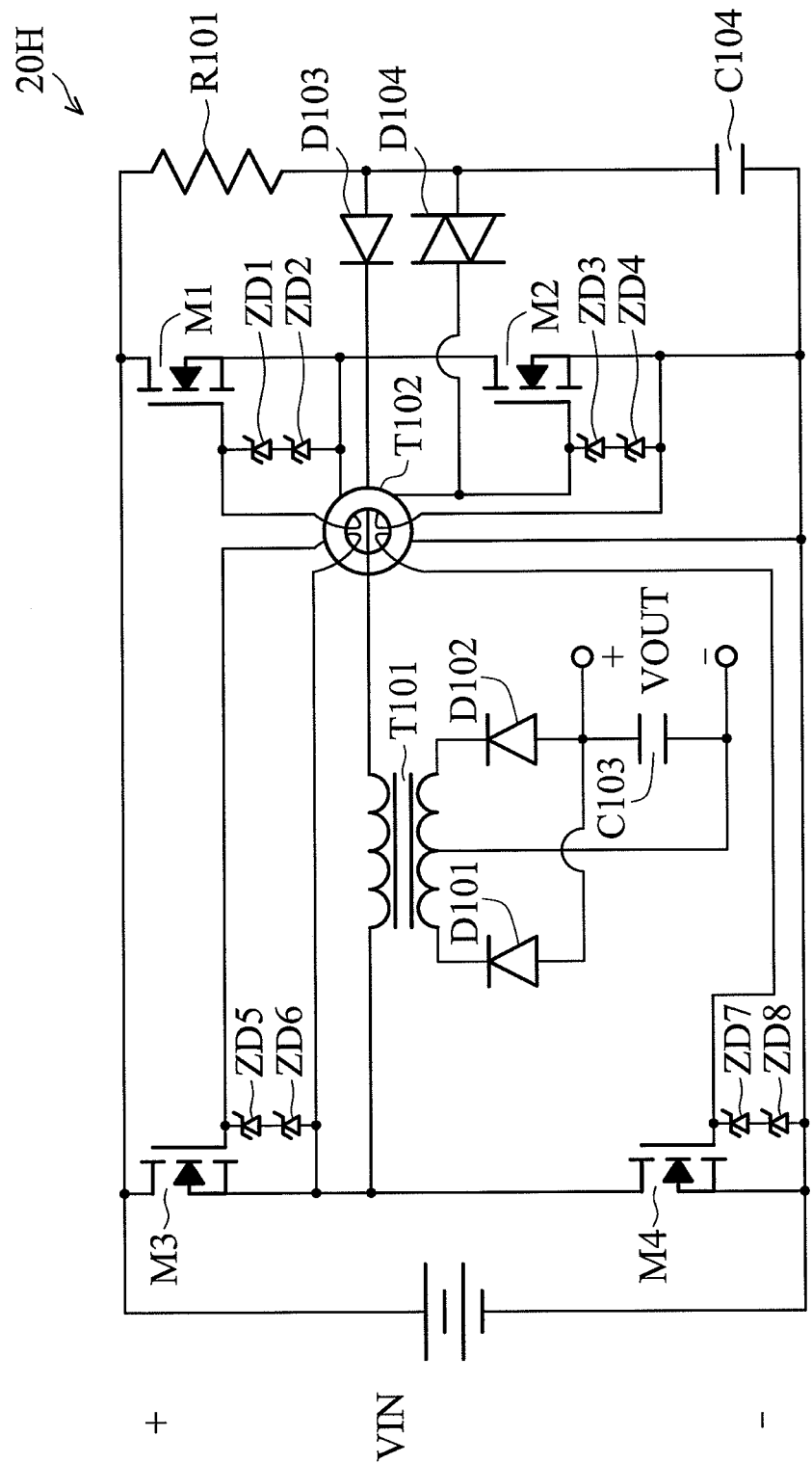
FIG. 6H illustrates an embodiment of a non-regulated isolation DC to DC converter 20" of the invention.

FIG. 6H illustrates another embodiment of a non-regulated isolation DC to DC converter 20" of the invention. As illustrated in FIG. 6H, the non-regulated isolation DC to DC converter 20H is similar to the non-regulated isolation DC to DC converter 20G illustrated in FIG. 6G. The difference is that the switching device SW1 is replaced by the MOSFET M1 and the zener diodes ZD1 and ZD2, the switching device SW2 is replaced by the MOSFET M2 and the zener diodes ZD3 and ZD4, the switching device SW3 is replaced by the MOSFET M3 and the zener diodes ZD5 and ZD6 and the switching device SW4 is replaced by the MOSFET M4 and the zener diodes ZD7 and ZD8. The MOSFET M1 is coupled between the positive terminal of the input voltage VIN and the first terminal of the MOSFET M2. The MOSFET M2 is coupled between the second terminal of the MOSFET M1 and the negative terminal of the input voltage VIN. The MOSFET M3 is coupled between the positive terminal of the input voltage VIN and the first terminal of the MOSFET M4. The MOSFET M4 is coupled between the second terminal of the MOSFET M3 and the negative terminal of the input voltage VIN. Two terminals of the first coil of the transformer T102 are coupled to the control terminal and the second terminal of the MOSFET M1, respectively. Two terminals of the second coil of the transformer T102 are coupled to the control terminal and the second terminal of the MOSFET M2, respectively. Two terminals of the third coil of the transformer T102 are coupled to the control terminal and the second terminal of the MOSFET M3, respectively. Two terminals of the fourth coil of the transformer T102 are coupled to the control terminal and the second terminal of the MOSFET M4, respectively. The zener diodes ZD1 and ZD2 are coupled inversely in serial between the control terminal and the second terminal of the MOSFET M1. The zener diodes ZD3 and ZD4 are coupled inversely in serial between the control terminal and the second terminal of the MOSFET M2. The zener diodes ZD5 and ZD6 are coupled inversely in serial between the control terminal and the second terminal of the MOSFET M3. The zener diodes ZD7 and ZD8 are coupled inversely in serial between the control terminal and the second terminal of the MOSFET M4. The operation of the non-regulated isolation DC to DC converter 20G is similar to the operation of the non-regulated isolation DC to DC converter 20B illustrated in FIG. 6B, and thus, detailed descriptions are omitted for brevity.

Figure 6I:
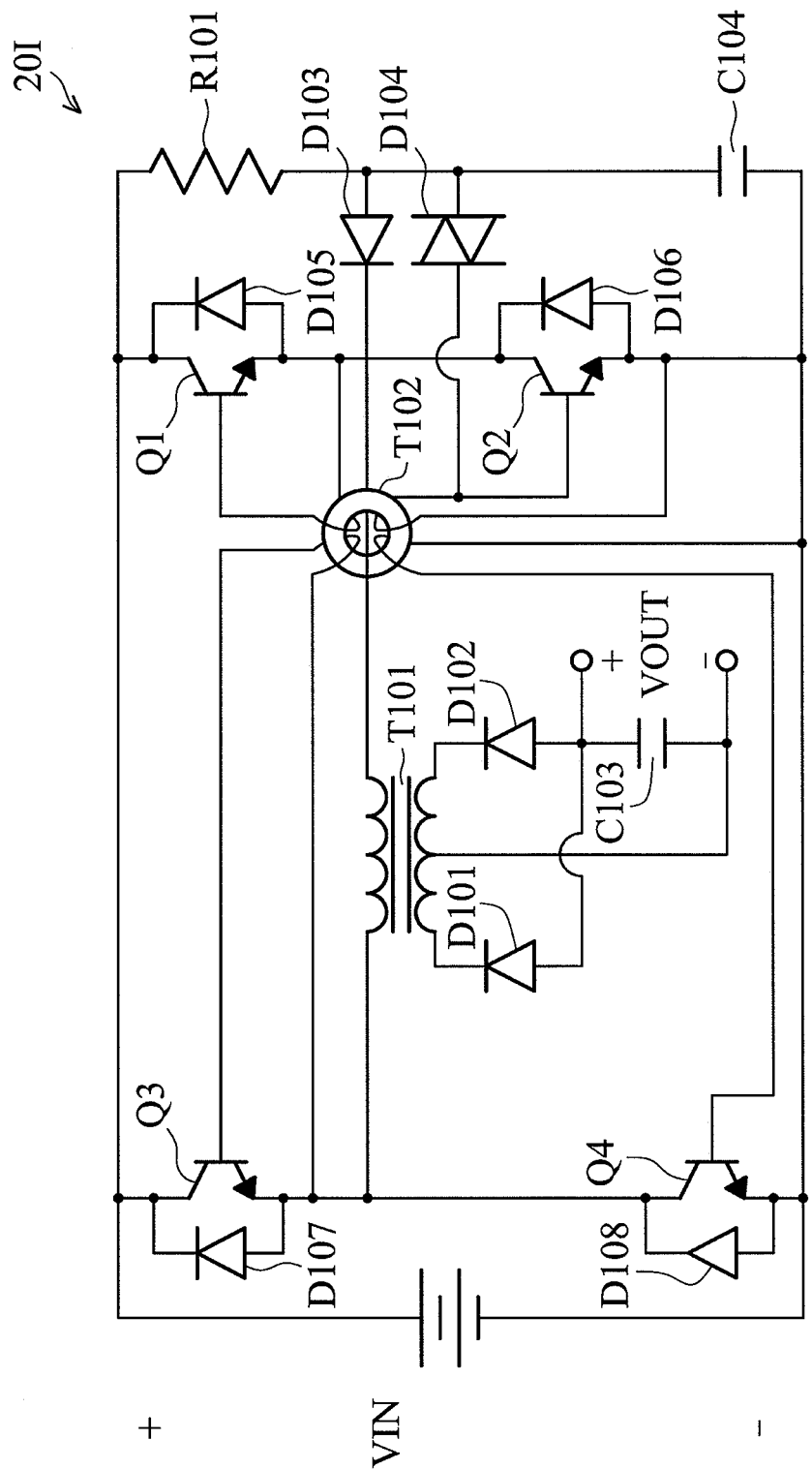
FIG. 6I illustrates an embodiment of a non-regulated isolation DC to DC converter 20" of the invention.

FIG. 6I illustrates another embodiment of a non-regulated isolation DC to DC converter 20" of the invention. As illustrated in FIG. 6I, the non-regulated isolation DC to DC converter 20I is similar to the non-regulated isolation DC to DC converter 20G illustrated in FIG. 6G. The difference is that the switching device SW1 is replaced by the BJT Q1 and the diode D105, the switching device SW2 is replaced by the BJT Q2 and the diode D106, the switching device SW3 is replaced by the BJT Q3 and the diode D107 and the switching device SW4 is replaced by the BJT Q4 and the diode D108. The BJT Q1 is coupled between the positive terminal of the input voltage VIN and the collector of the BJT Q2. The BJT Q2 is coupled between the emitter of the BJT Q1 and the negative terminal of the input voltage VIN. The BJT Q3 is coupled between the positive terminal of the input voltage VIN and the collector of the BJT Q4. The BJT Q4 is coupled between the emitter of the BJT Q3 and the negative terminal of the input voltage VIN. Two terminals of the first coil of the transformer T102 are coupled to the base and the emitter of the BJT Q1, respectively. Two terminals of the second coil of the transformer T102 are coupled to the base and the emitter of the BJT Q2, respectively. Two terminals of the third coil of the transformer T102 are coupled to the base and the emitter of the BJT Q3, respectively. Two terminals of the fourth coil of the transformer T102 are coupled to the base and the emitter of the BJT Q4, respectively. The cathode and the anode of the diode D105 are coupled to the collector and the emitter of the BJT Q1, respectively. The cathode and the anode of the diode D106 are coupled to the collector and the emitter of the BJT Q2, respectively. The cathode and the anode of the diode D107 are coupled to the collector and the emitter of the BJT Q3, respectively. The cathode and the anode of the diode D108 are coupled to the collector and the emitter of the BJT Q4, respectively. The operation of the non-regulated isolation DC to DC converter 20I is similar to the operation of the non-regulated isolation DC to DC converter 20G illustrated in FIG. 6G, and thus, detailed descriptions are omitted for brevity.

Figure 6J:
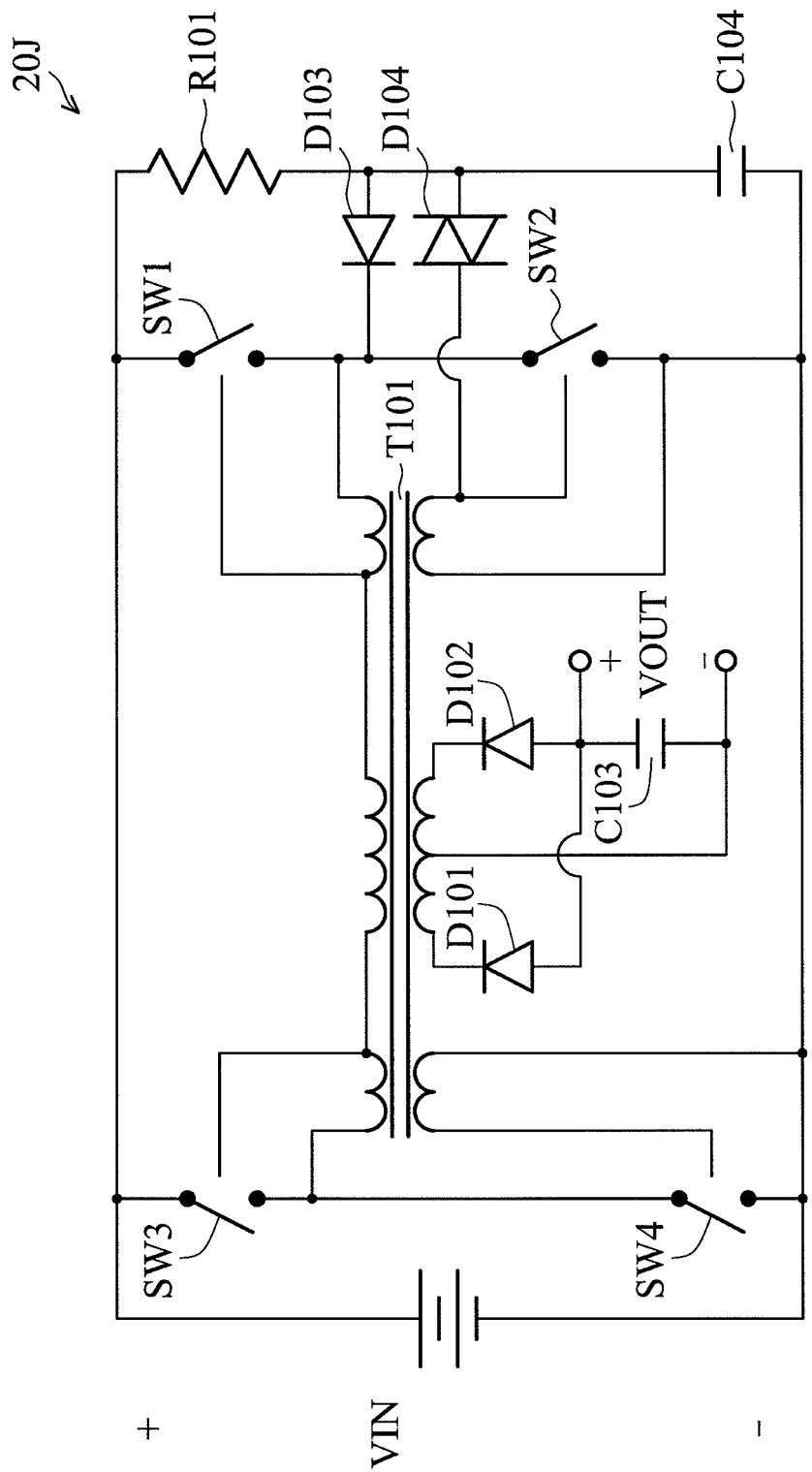
FIG. 6J illustrates an embodiment of a non-regulated isolation DC to DC converter 20" of the invention.

FIG. 6J illustrates another embodiment of a non-regulated isolation DC to DC converter 20" of the invention. As illustrated in FIG. 6J, the non-regulated isolation DC to DC converter 20J is similar to the non-regulated isolation DC to DC converter 20G illustrated in FIG. 6G. The difference is that the switching devices SW1~SW4 are driven by the voltage generated on the coils of the transformer T101 rather than that of the transformer T102.

Figure 6K:
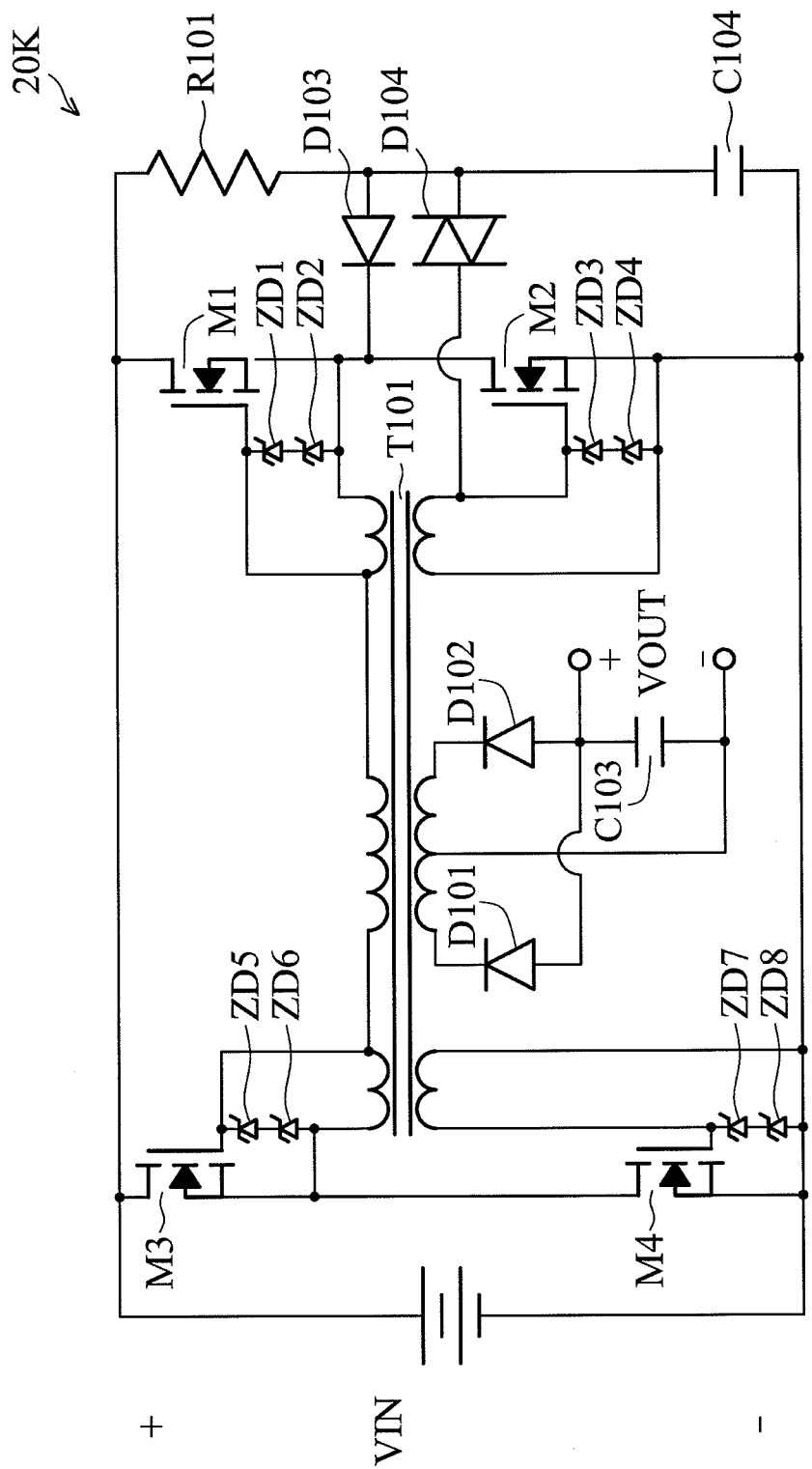
FIG. 6K illustrates an embodiment of a non-regulated isolation DC to DC converter 20" of the invention.

FIG. 6K illustrates another embodiment of a non-regulated isolation DC to DC converter 20" of the invention. As illustrated in FIG. 6K, the non-regulated isolation DC to DC converter 20K is similar to the non-regulated isolation DC to DC converter 20H illustrated in FIG. 6H. The difference is that the MOSFETs M1~M4 are driven by the voltage generated on the coils of the transformer T101 rather than that of the transformer T102.

Figure 6L:
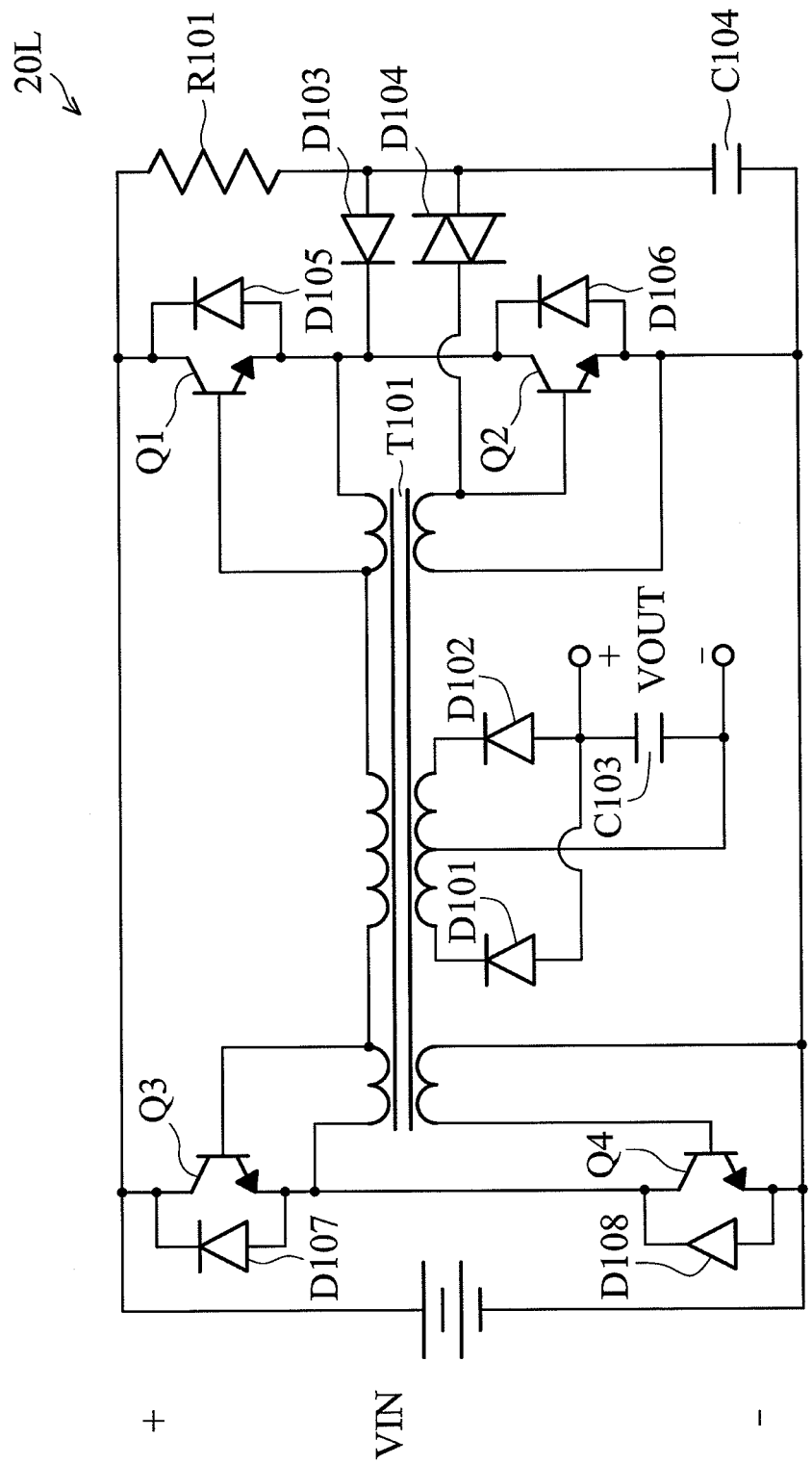
FIG. 6L illustrates an embodiment of a non-regulated isolation DC to DC converter 20" of the invention.

FIG. 6L illustrates another embodiment of a non-regulated isolation DC to DC converter 20" of the invention. As illustrated in FIG. 6L, the non-regulated isolation DC to DC converter 20L is similar to the non-regulated isolation DC to DC converter 20I illustrated in FIG. 6I. The difference is that the BJTs Q1~Q4 are driven by the voltage generated on the coils of the transformer T101 rather than that of the transformer T102.

Figure 7A:
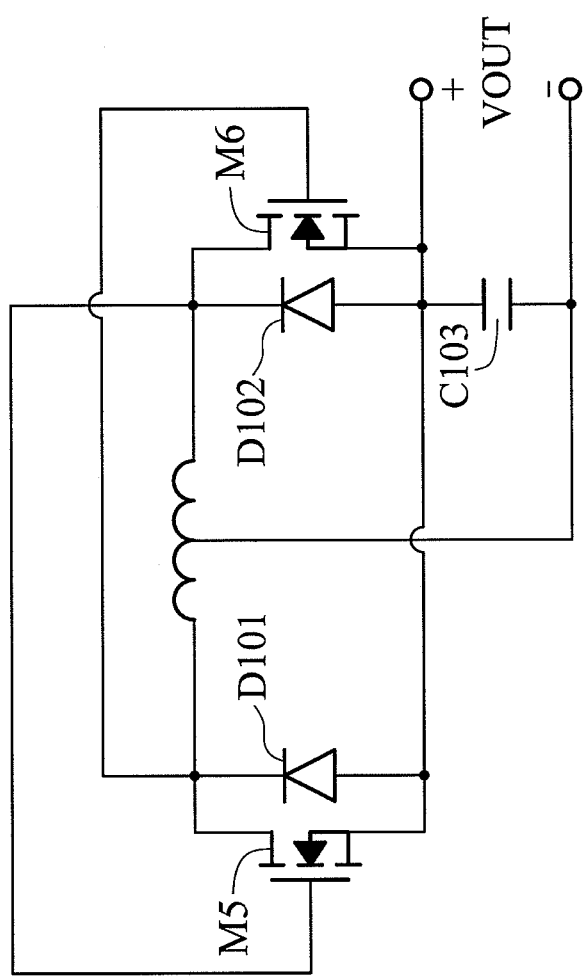
FIG. 7A illustrates another embodiment of a rectifier circuit of the non-regulated isolation DC to DC converter of the invention.

FIG. 7A illustrates another embodiment of a rectifier circuit of the non-regulated isolation DC to DC converter of the invention. As illustrated in FIG. 7A, the rectifier circuit is similar to that of the same element illustrated in FIG. 6A. The difference is that the rectifier circuit illustrated in FIG. 7A further comprises MOSFETs M5 and M6, wherein the MOSFET M5 has a first terminal coupled to the cathode of the diode D101, a second terminal coupled to the anode of the diode D101 and a control terminal coupled to the second terminal of the secondary winding of the transformer T101. The MOSFET M6 has a first terminal coupled to the cathode of the diode D102, a second terminal coupled to the anode of the diode D102 and a control terminal coupled to the first terminal of the secondary winding of the transformer T101. In other words, in the non-regulated isolation DC to DC converter, the MOSFETs M5 and M6 and the switching devices SW1~SW4 are driven by the voltage generated on the coils of the transformer T101.

Figure 7B:
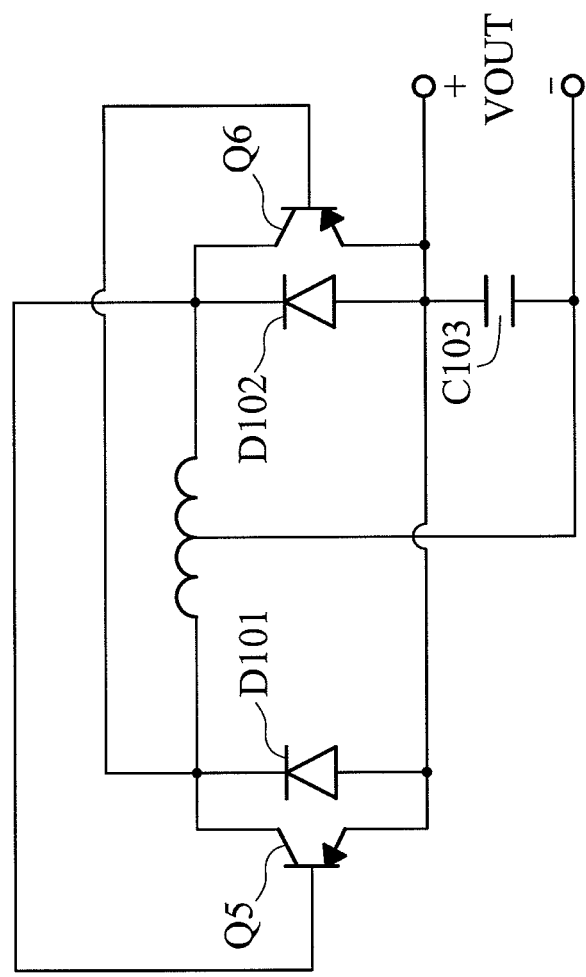
FIG. 7B illustrates another embodiment of a rectifier circuit of the non-regulated isolation DC to DC converter of the invention.

FIG. 7B illustrates another embodiment of a rectifier circuit of the non-regulated isolation DC to DC converter of the invention. As illustrated in FIG. 7B, the rectifier circuit is similar to that of the same element illustrated in FIG. 7A. The difference is that the MOSFET M5 is replaced by a BJT Q5 and the MOSFET M6 is replaced by a BJT Q6, wherein the BJT Q5 has a collector coupled to the cathode of the diode D101, an emitter coupled to the anode of the diode D101 and a base coupled to the second terminal of the secondary winding of the transformer T101. The BJT Q6 has a collector coupled to the cathode of the diode D102, an emitter coupled to the anode of the diode D102 and a base coupled to the first terminal of the secondary winding of the transformer T101. In other words, in the non-regulated isolation DC to DC converter, the BJTs Q5 and Q6 and the switching devices SW1~SW4 are driven by the voltage generated on the coils of the transformer T101.

Figure 7C:
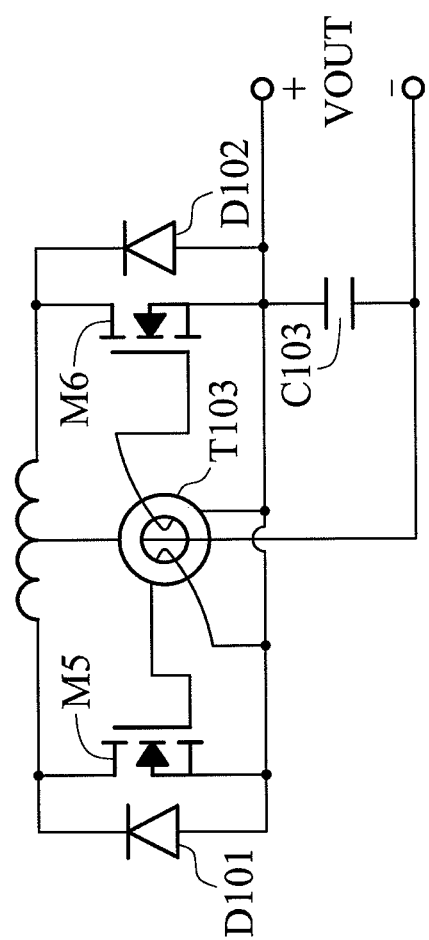
FIG. 7C illustrates another embodiment of a rectifier circuit of the non-regulated isolation DC to DC converter of the invention.

FIG. 7C illustrates another embodiment of a rectifier circuit of the non-regulated isolation DC to DC converter of the invention. As illustrated in FIG. 7C, the rectifier circuit is similar to that of the same element illustrated in FIG. 7A. The difference is that the rectifier circuit, illustrated in FIG. 7A, further comprises a transformer T103 to drive the MOSFETs M5 and M6. The transformer T103 has a main coil coupled to the center tap of the secondary winding of the transformer T101, a first coil arranged to drive the MOSFET M5 and a second coil arranged to drive the MOSFET M6. Two terminals of the first coil are coupled to the control terminal and the second terminal of the MOSFET M5, respectively. Two terminals of the second coil are coupled to the control terminal and the second terminal of the MOSFET M6, respectively. In other words, the MOSFETs M5 and M6 are driven by the voltage generated on the coils of the transformer T103.

Figure 7D:
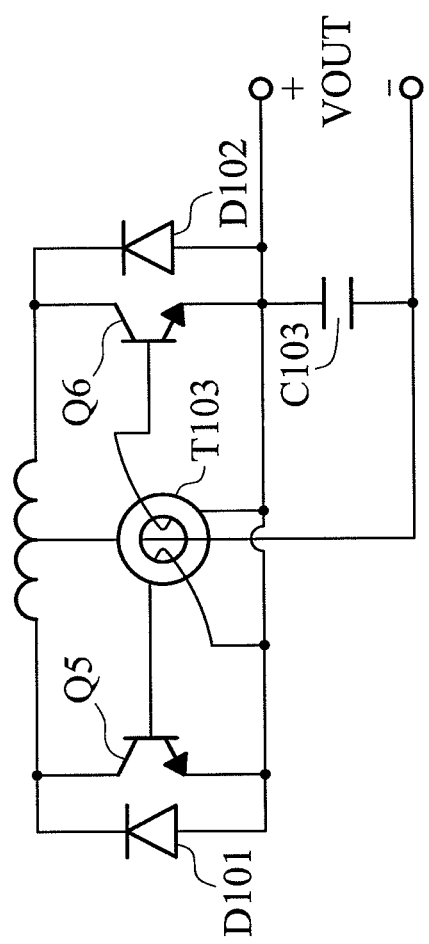
FIG. 7D illustrates another embodiment of a rectifier circuit of the non-regulated isolation DC to DC converter of the invention.

FIG. 7D illustrates another embodiment of a rectifier circuit of the non-regulated isolation DC to DC converter of the invention. As illustrated in FIG. 7D, the rectifier circuit is similar to that of the same element illustrated in FIG. 7C. The difference is that the MOSFET M5 is replaced by the BJT Q5 and the MOSFET M6 is replaced by the BJT Q6, wherein the BJT Q5 has a collector coupled to the cathode of the diode D101, an emitter coupled to the anode of the diode D101 and a base coupled to the second terminal of the secondary winding of the transformer T101. The BJT Q6 has a collector coupled to the cathode of the diode D102, an emitter coupled to the anode of the diode D102 and a base coupled to the first terminal of the secondary winding of the transformer T101. In other words, the BJTs Q5 and Q6 and the switching devices SW1~SW4 are driven by the voltage generated on the coils of the transformer T101.

Furthermore, in FIG. 7A~7D, the duty cycles of the MOSFETs M5 and M6 or those of the BJTs Q5 and Q6 deposited on the secondary winding are the same as those of the switching device deposited on the primary winding of the transformer T101. In addition, the switching frequencies of those elements are all the same.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lighting device, comprising:
   at least one light emitting diode module;
   a power factor correction circuit, performing a power factor correction on an AC power source and outputting a corrected DC voltage;
   a non-regulated isolation DC to DC converter, generating an output voltage in a predetermined voltage range according to the corrected DC voltage, wherein the non-regulated isolation DC to DC converter is an open-loop controlled buck DC to DC converter; and
   at least one regulated non-isolation DC to DC converter, generating a fixed current or a fixed voltage according to the output voltage output from the non-regulated isolation DC to DC converter, thereby driving the light emitting diode module.

2. The lighting device as claimed in claim 1, wherein the non-regulated isolation DC to DC converter comprises a first transformer electrically isolating the corrected DC voltage and the output voltage.

3. The lighting device as claimed in claim 1, wherein the non-regulated isolation DC to DC converter comprises:
   at least one transformer; and
   a plurality of switching devices,
   wherein the switching devices are driven by voltage applied to the coils of the transformer.

4. The lighting device as claimed in claim 1, wherein the predetermined voltage range is defined by an upper threshold and a lower threshold, and the upper threshold and the lower threshold are rated voltages operating at a full load state and a no-load state, respectively, and the difference between the upper threshold and the lower threshold is lower than 100 volt.

5. The lighting device as claimed in claim 1, wherein the non-regulated isolation DC to DC converter comprises:
   a transformer;
   a plurality of first switching devices; and
   a plurality of second switching devices,
   wherein the first switching devices are coupled to a primary winding of the transformer, the second switching devices are coupled to a secondary winding of the transformer and the duty cycle of the first and second switching devices are the same.

6. The lighting device as claimed in claim 1, wherein the non-regulated isolation DC to DC converter comprises:
   a first transformer, electrically isolating the corrected DC voltage and the output voltage;
   a second transformer, coupled to the first transformer and comprising a plurality of coils; and
   a plurality of switching devices, driven by the coils of the second transformer.

7. The lighting device as claimed in claim 1, wherein the non-regulated isolation DC to DC converter comprises:
   a first transformer, electrically isolating the corrected DC voltage and the output voltage; and
   a plurality of switching devices, driven by coils of the first transformer.

8. The lighting device as claimed in claim 1, wherein the non-regulated isolation DC to DC converter is a half-bridge DC to DC converter or a full-bridge DC to DC converter.

9. The lighting device as claimed in claim 1, wherein the lighting device is an outdoor display unit and the light emitting diode module comprises a plurality of light emitting diodes.

10. A lighting device, comprising:
    a non-regulated isolation DC to DC converter, generating an output voltage in a predetermined voltage range according to the corrected DC voltage from a power factor correction circuit, wherein the non-regulated isolation DC to DC converter is an open-loop controlled buck DC to DC converter and comprises a first transformer electrically isolating the corrected DC voltage and the output voltage;
    a plurality of light emitting diode modules; and
    a plurality of regulated non-isolation DC to DC converters, generating a fixed current or a fixed voltage according to the output voltage output from the non-regulated isolation DC to DC converter, thereby driving the light emitting diode module.

11. The lighting device as claimed in claim 10, wherein the predetermined voltage range is defined by an upper threshold and a lower threshold, and the upper threshold and the lower threshold are rated voltages operating at a full load state and a no-load state, respectively, and the difference between the upper threshold and the lower threshold is lower than 100 volt.

12. The lighting device as claimed in claim 11, wherein the non-regulated isolation DC to DC converter further comprises a plurality of switching devices, and the switching devices are driven by voltage generated on the coils of the first transformer.

13. The lighting device as claimed in claim 11, wherein the non-regulated isolation DC to DC converter comprises:
   a second transformer, coupled to the first transformer and comprising a plurality of coils; and
   a plurality of switching devices, driven by the coils of the second transformer.

14. The lighting device as claimed in claim 11, wherein the non-regulated isolation DC to DC converter is a half-bridge DC to DC converter or a full-bridge DC to DC converter.

15. The lighting device as claimed in claim 11, wherein the lighting device is an outdoor display unit and the light emitting diode module comprises a plurality of light emitting diodes.

16. A lighting device, comprising:
   a light emitting diode module, each comprising a plurality of light emitting diodes;
   a power factor correction circuit, performing a power factor correction on an AC power source and outputting a corrected DC voltage;
   a non-regulated isolation DC to DC converter, generating an output voltage in a predetermined voltage range according to the corrected DC voltage, wherein the non-regulated isolation DC to DC converter is controlled with an open-loop such that the output voltage is not maintained in a fixed voltage; and
   a regulated non-isolation DC to DC converter, generating a fixed current or a fixed voltage according to the output voltage output from the non-regulated isolation DC to DC converter, thereby driving the light emitting diode module, wherein the non-regulated isolation DC to DC converter comprises a first transformer to electrically isolate the corrected DC voltage and the output voltage, and does not comprises transformer.

17. The lighting device as claimed in claim 16, wherein the non-regulated isolation DC to DC converter further comprises a plurality of switching devices, and the switching devices are driven by voltage generated on the coils of the first transformer.

18. The lighting device as claimed in claim 16, wherein the non-regulated isolation DC to DC converter comprises:
   a second transformer, coupled to the first transformer; and
   a plurality of switching devices, driven by the coils of the second transformer.

19. The lighting device as claimed in claim 16, wherein the non-regulated isolation DC to DC converter is a half-bridge DC to DC converter or a full-bridge DC to DC converter.

20. The lighting device as claimed in claim 16, wherein the lighting device is an outdoor display unit.

* * * * *